(No Model.)
W. S. BAUGH.
HAY LOADER.
No. 515,272.  Patented Feb. 20, 1894.
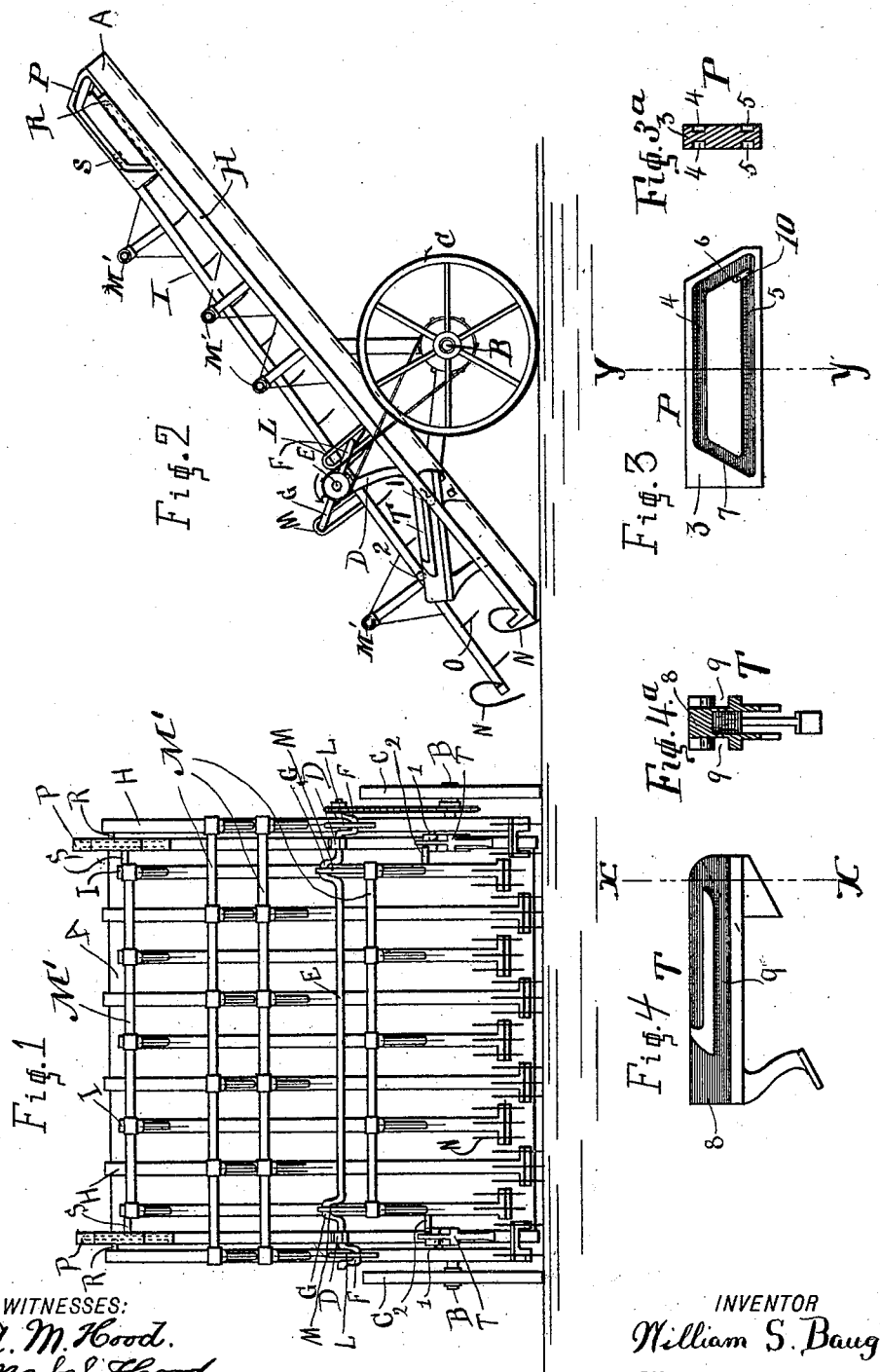
WITNESSES:
A. M. Hood.
Mabel Hood.
INVENTOR
William S. Baugh.
BY
C. F. Belt
ATTORNEY.

UNITED STATES PATENT OFFICE.

WILLIAM S. BAUGH, OF FARMERS' INSTITUTE, INDIANA.

HAY-LOADER.

SPECIFICATION forming part of Letters Patent No. 515,272, dated February 20, 1894.

Application filed May 13, 1893. Serial No. 474,052. (No model.)

*To all whom it may concern:*

Be it known that I, WILLIAM S. BAUGH, a citizen of the United States, residing at Farmers' Institute, in the county of Tippecanoe and State of Indiana, have invented a new and useful Hay-Loader, of which the following is a specification.

My invention relates to an improvement in hay-loading machines.

The object of my improvements is to provide means whereby the rakes, during the working portion of their stroke, will be carried parallel to the ground.

The accompanying drawings illustrate my invention.

Figure 1 is an end elevation. Fig. 2 is a side elevation. Fig. 3 is a side elevation. Fig. $3^a$ is a sectional view of the upper cam, taken on the line X—X in Fig. 3. Fig. 4 is a side elevation. Fig. $4^a$ is a sectional view of the lower cam taken on the line Y—Y in Fig. 4.

In the drawings, A, indicates the trough-like elevator way of the loader which is mounted upon the axle, B, and carrying wheels, C, in the usual well known manner. Brackets, D, are mounted on each side of the body A substantially as shown. Journaled in the brackets D is the double crank shaft, E, which is provided with cranks, F, and, G, the two sets of cranks being diametrically opposed to each other and so arranged as to allow the two sets of rake bars, H, and, I, to be suspended from them by means of the slotted bearings, L, and, M. The alternate rake bars are connected by means of the cross bars M'. Rake teeth, N, which are of any convenient form, are mounted upon the ends of the rake bars H and I and on the under side of said bars are mounted teeth, O, in the usual well known manner. The upper end of each set of rake bars H and I is connected to the elevator way by means of cams, P, P, which are secured to the upper edges of the elevator way, the rake bars being connected with said ways by means of pins, R, or, S, which project laterally from the sides of the bars H or I into said cams so that as the rake bars are pushed backward and forward by the rotation of the crank shaft the pin traverses the grooved cam and the rake bars swing upon the pins R or S. Cam plates P each consist of a web or plate, 3, having formed on each side a grooved cam-way consisting of parallel portions, 4, and, 5, which are connected by the inclines, 6, and, 7. At the juncture of the groove 5 and the incline 6, is formed a switch 10, to receive the pins that carry the upper ends of the rake bars and travel, so that said pins by falling into the switch are forced to make a complete circuit of the cam. This switch is of material importance for the cam without it would allow the said pins to travel back and forth on the lower portion of the cam, instead of traveling entirely around it.

The operation of my device is as follows: As the machine is drawn forward, crank shaft E is revolved, in the direction shown by the arrow Fig. 2, by means of the carrying wheels and the intermediate connecting mechanism. Each of the rakes is in succession raised from the bed of the elevator way and carried through the position shown to be occupied by bars I in the drawings and from thence backward and downward until the teeth, N, touch the ground and come into position to gather the material to be raked. During further rotation of the crank shaft the cranks are allowed to slide through the slotted bearing thus causing the rakes to be drawn forward along the ground and up the elevator way until the crank again comes in contact with the upper end of the slotted bearings and the rake bars are again lifted from the bed of the elevator way, the lower ends of said bars being lifted by means of the slotted ways and the upper ends by means of the pins R or S and the cams P. The rakes N are kept close to the ground by the weight of the rake bars. For the purpose of preventing the rising of the rake bars while moving parallel and in contact with the ground I provide a pair of cams, T, which are mounted at the lower end and on the opposite sides of the elevator way and serve as a guideway for the pins, 1, and, 2. Each of these cam-plates consists of a web or plate, 8, having formed on opposite sides a grooved way, 9, which is open at each end. The pins 1 and 2 project laterally respectively from the sides of the rake bars H and I and are arranged to traverse the cams T during the forward stroke of said bars, the arrangement being such that the rake bars having been raised through the position shown by the bar I in Fig. 2, by the rotation of the crank shaft; as the rake is lowered its projecting pin engages the cam and the continued motion of the shaft carries the rake bar forward in substantially a horizontal position, its path being positively controlled by the cams T and P.

I claim as my invention—

1. In a hay loader, the combination of the elevator way, the crank shaft mounted thereon, the cam plates mounted at the upper end of the elevator way, the rake bars slidably engaging the said cam plates and suspended from the crank shaft by means of the slotted bearings, the carrying wheels and intermediate connecting mechanism connecting the carrying wheels and the crank shaft whereby the crank shaft is rotated by the forward movement of the machine, all arranged to co-operate substantially as and for the purpose set forth.

2. In a hay loader, the combination with the elevator way, the crank shaft mounted thereon, and the rake bars suspended by slotted bearings from said shaft and provided at their upper ends with laterally projecting pins, of the pair of cam plates formed substantially as shown and described and mounted upon the upper end of the elevator way so as to engage said pins, whereby the upper ends of the rake bars are raised on the completion of their forward movement and are lowered at the end of their backward movement, all substantially as set forth.

3. In a hay loader, the combination with the elevator way, the crank shaft mounted thereon, and the rake bars suspended by slotted bearings from said shaft and provided at their lower ends with laterally projecting pins, of the pair of cam plates formed substantially as shown and described and mounted upon the lower end of the elevator way so as to engage said pins whereby the lower ends of the rake bars are caused to move parallel with the ground during their forward movement.

4. In a hay loader, the combination with the elevator-way, the series of rake-bars mounted thereon, and the cross bars M' connecting the said rake-bars alternately, of the multiple crank shaft mounted on the elevator-way, and the slotted bearings connecting the cranks of the shaft with the several rake-bars, whereby a reciprocating oscillating movement is imparted to the rake-bars by the revolution of the crank-shaft, substantially as and for the purpose set forth.

5. In a hay loader, the combination with the series of rake bars, the cross bars connecting said rake-bars alternately, and the elevator way, of the cams secured to the elevator way, the pins R, and S, connecting each set of rake bars with the said cams, the multiple crank shaft mounted on the said elevator way, and the slotted bearings connecting the cranks of the shaft with the several rake bars, substantially as shown and described and for the purpose set forth.

WILLIAM S. BAUGH.

Witnesses:
J. C. SMALLEY,
THOS. H. BRENNAN.